Dec. 5, 1939.    O. H. PADDOCK    2,182,448
APPARATUS FOR BENDING GLASS SHEETS
Filed Nov. 18, 1937    2 Sheets-Sheet 1
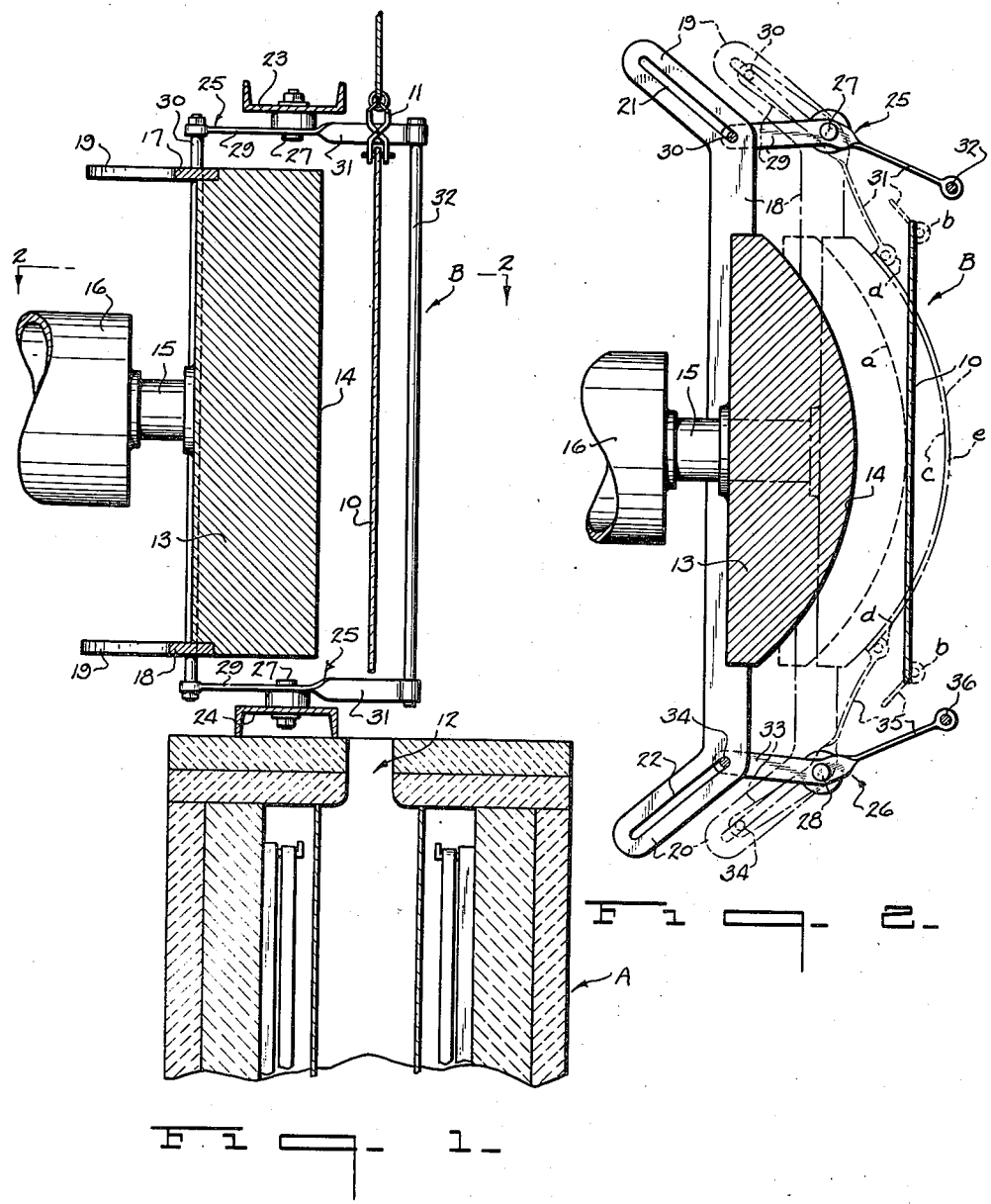
Inventor
ORMOND H. PADDOCK.
By Frank Fraser
Attorney Dec. 5, 1939.     O. H. PADDOCK     2,182,448
APPARATUS FOR BENDING GLASS SHEETS
Filed Nov. 18, 1937     2 Sheets-Sheet 2
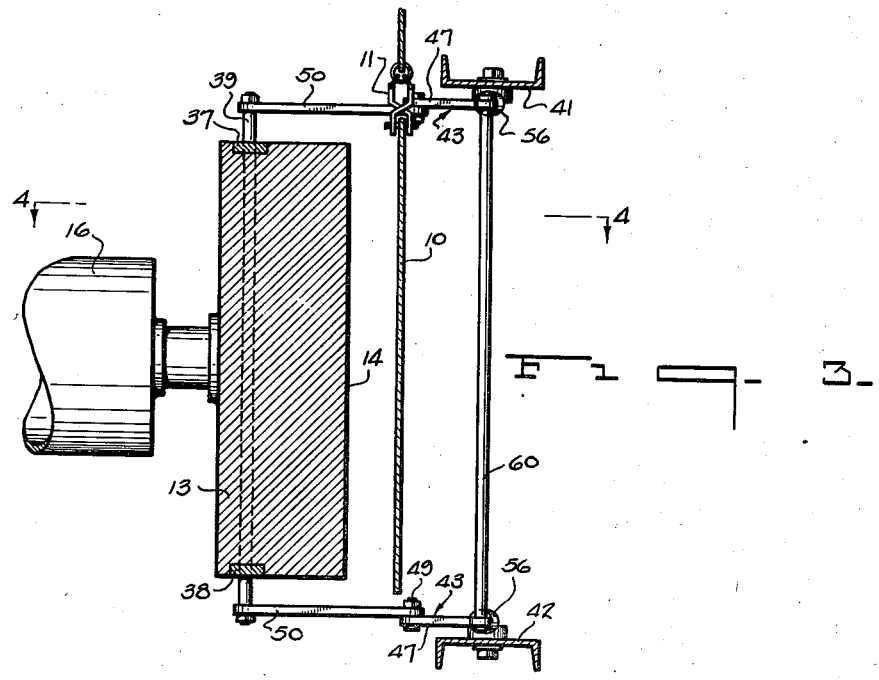
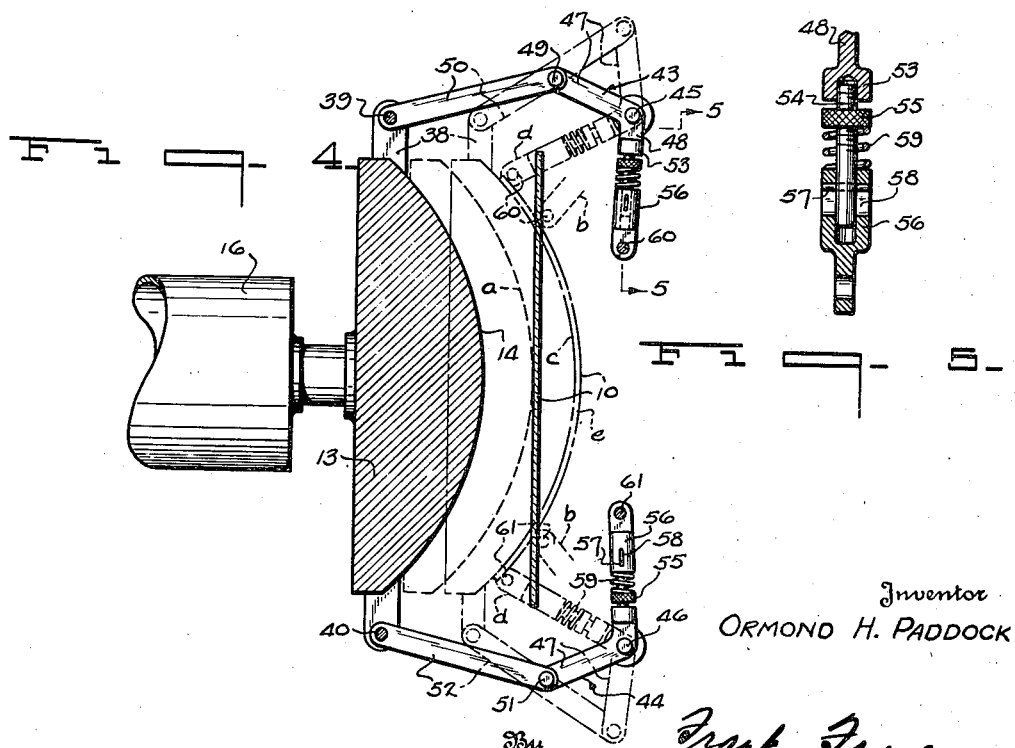
Inventor
ORMOND H. PADDOCK
By Frank Fraser
Attorney Patented Dec. 5, 1939

2,182,448

UNITED STATES PATENT OFFICE 2,182,448

APPARATUS FOR BENDING GLASS SHEETS

Ormond H. Paddock, Rossford, Ohio, assignor to Libbey-Owens-Ford Glass Company, Toledo, Ohio, a corporation of Ohio Application November 18, 1937, Serial No. 175,245

3 Claims. (Cl. 49—7)

The present invention relates to an improved method of and apparatus for bending glass sheets or plates to predetermined curvatures.

In carrying out this invention, the glass sheet or plate to be bent is first heated, while suspended in a vertical position, to a temperature approximating the softening temperature of the glass, after which the highly heated sheet or plate, while thus vertically suspended, is bent to a predetermined curvature.

It is the primary object of the invention to provide a method and apparatus whereby glass sheets or plates can be bent, while suspended in a vertical position, to a desired predetermined curvature in a thoroughly practical and efficient manner, with considerably less liability of breakage of the glass and a greatly reduced tendency toward marring of the glass surfaces.

Other objects and advantages of the invention will become more apparent during the course of the following description when taken in connection with the accompanying drawings.

In the drawings wherein like numerals are employed to designate like parts throughout the same:

Fig. 1 is a vertical sectional view through bending apparatus constructed in accordance with the invention;

Fig. 2 is a horizontal sectional view taken substantially on line 2—2 of Fig. 1;

Fig. 3 is a vertical sectional view through a slightly modified form of bending apparatus also embodying the principles of the invention;

Fig. 4 is a horizontal sectional view taken substantially on line 4—4 of Fig. 3; and Fig. 5 is a detail sectional view taken substantially on line 5—5 of Fig. 4.

With reference now to the drawings and particularly to Figs. 1 and 2, the letter A designates in its entirety a vertical-type furnace in which the glass sheet 10 to be bent is adapted to be heated, while B designates generally the improved bending apparatus here shown as being mounted directly above the furnace A for receiving the heated glass sheet therefrom. The glass sheet 10 is preferably suspended vertically in the furnace from a plurality of hooks or tongs 11 engaging said sheet near its upper edge and after the sheet has been heated to the proper temperature, it is lifted vertically through the opening 12 in the top of the furnace into position for bending as shown in Fig. 1. Although the bending apparatus B has been illustrated in connection with a vertical-type furnace A, it will be readily apparent that any suitable kind of furnace may be employed and the bending apparatus associated therewith in any desired manner. Consequently, the invention is not limited to the use of any particular type of furnace or to any particular association between the furnace and bending apparatus.

The bending apparatus B comprises a mold member 13 of any preferred width and height and provided with an inner convex bending surface 14, the curvature of which corresponds to the curvature to be given the glass sheet 10. The mold 13 is carried by a horizontal plunger 15 operating in a cylinder 16, the horizontal movement of said mold being controlled in any well known manner by hydraulic or air pressure within the cylinder 16.

Carried at the top and bottom of the mold 13 are the longitudinally extending metal strips 17 and 18, each strip being provided at its opposite ends with angular extensions or arms 19 and 20 diverging rearwardly at an obtuse angle to the intermediate body portion of the strip and provided with slots 21 and 22 respectively. Mounted above and beneath the mold 13, in spaced relation thereto, are the stationary supporting members 23 and 24 and carried by each supporting member, outwardly of the opposite ends of said mold, are the rocker arms 25 and 26 pivotally mounted intermediate their ends for horizontal rocking movement upon vertical pins 27 and 28 respectively carried by said supporting member.

The inner end portions 29 of rocker arms 25 are connected together by a vertical guide rod 30 passing loosely through the slots 21 in the angular extensions 19 of strips 17 and 18, while the outer end portions 31 of said rocker arms 25 are connected together at their outer ends by a vertical bending rod 32. On the other hand, the inner end portions 33 of rocker arms 26 are connected together by a vertical guide rod 34 passing loosely through the slots 22 in the angular extensions 20 of the strips 17 and 18, while the outer end portions 35 of said rocker arms 26 are connected together at their outer ends by a vertical bending rod 36.

In the operation of bending apparatus B, the glass sheet 10, after being heated to the proper temperature in furnace A, is brought into position for bending, at which time it is disposed opposite to but spaced from the convex bending surface 14 of the mold 13 as shown in full lines in the drawings. When the glass sheet 10 is brought into position for bending, the mold 13 and associated parts, including the rocker arms 25 and 26 and bending rods 32 and 36, are also in the positions shown in full lines, with the said bending rods 32 and 36 being disposed forwardly of the sheet. After the glass sheet has been properly located, the mold 13 is moved forwardly to the position indicated $a$ to engage the adjacent face of the sheet at a point intermediate the vertical edges thereof and simultaneously the outer ends of rocker arms 25 and 26 will be swung inwardly to bring the bending rods 32 and 36 to the position indicated $b$ where they will contact the opposite face of the glass sheet adjacent opposite vertical edges thereof. Thus, during the forward movement of the mold 13 to its position $a$, the guide rods 30 and 34 will move outwardly in the slots 21 and 22 of the extensions 19 and 20 to effect swinging movement of the bending rods 32 and 36 into position $b$. Continued outward movement of the mold to the position indicated $c$, will cause the bending rods 32 and 36 to be simultaneously moved inwardly to the position indicated $d$, and obviously during such movement of the mold and bending rods in opposite directions, the glass sheet 10 will be wrapped about the convex bending surface 14 of the mold as indicated at $e$. In other words, the mold 13 will apply bending pressure to one side of the glass sheet intermediate the edges thereof to effect the bending of the central portion of said sheet outwardly while simultaneously the rods 32 and 36 will apply bending pressure to the opposite side of the sheet, adjacent opposite edges thereof only, to effect the bending of the edge portions of said sheet inwardly.

The outer end portions 31 and 35 of the rocker arms 25 and 26 respectively are preferably formed of spring steel so that these portions of the rocker arms are free to give when the edge portions of the glass sheet engage the mold 13 whereby to minimize marring of the outer surface of the sheet by the bending rods 32 and 36 as well as permit the bending of glass sheets of different thicknesses.

After the glass sheet 10 has been bent, it can either be annealed by a slow and gradual cooling thereof, or, if preferred, the said sheet can be tempered by subjecting it to a sudden cooling or chilling treatment as well known in the art.

In Figs. 3, 4 and 5 is illustrated a slightly modified form of apparatus for bending the glass sheet, with the principal difference between this form of the invention and that described above being in the construction and arrangement of the bending means which engage the glass sheet adjacent opposite edges thereof. The glass sheet to be bent is here also designated 10 and the mold member 13 which is operated in the same manner as described above and provided with a vertical convex bending surface 14. Carried at the top and bottom of the mold 13 are the longitudinally extending metal strips 37 and 38 which project beyond said mold at opposite ends thereof, said strips 37 and 38 being connected together at one end by a vertical rod 39 and at their opposite end by a vertical rod 40.

Mounted above and beneath the mold 13, forwardly thereof, are the fixed supporting members 41 and 42 and carried by each of said members adjacent the opposite ends of the mold are the horizontal bell-crank levers 43 and 44 respectively pivotally mounted intermediate their ends upon pins 45 and 46 carried by the supporting member. Each bell-crank lever 43 and 44 comprises an inner arm 47 and a relatively shorter outer arm 48 extending at an obtuse angle with respect to arm 47. The arms 47 of the bell-cranks levers 43 are pivotally connected at their outer ends, as at 49, to links 50 pivotally carried by the vertical rod 39, while the arms 47 of bell-crank levers 44 are pivotally connected as at 51 to links 52 carried by the vertical rod 40.

The arm 48 of each of the bell-crank levers 43 and 44 is provided at its outer end with a head 53 having a recess within which is threaded one end of a pin 54 carrying a nut 55. Slidably received upon the outer end of the pin 54 is a sleeve 56 held upon the pin by a key 57 passing transversely through said pin and having its opposite ends received in longitudinal slots 58 formed in the sleeve 56. Encircling the pin 54 between the nut 55 and sleeve 56 is a compression spring 59 which serves to normally urge said sleeve outwardly, although the said sleeve can be readily moved inwardly upon compression of the said spring. Extending between and connecting the sleeves 56 of bell-crank levers 43 is a vertical bending rod 60, while a similar bending rod 61 extends vertically between and connects the sleeves 56 of bell-crank levers 44.

The operation of the bending apparatus illustrated in Figs. 3, 4 and 5 is substantially the same as that of the apparatus disclosed in Figs. 1 and 2. Thus, after the glass sheet 10 to be bent has been heated to the proper temperature, it is brought into position opposite the mold 13, as shown in Figs. 3 and 4, at which time the said mold and associated parts, including the bell-crank levers 43 and 44 and bending rods 60 and 61, are in the positions indicated in full lines. Upon forward movement of the mold 13 to engage the inner face of the glass sheet, as indicated at $a$, the bell-crank levers 43 and 44 will be rocked about their pivots 45 and 46 to move the bending rods 60 and 61 inwardly into engagement with the outer face of the glass sheet as indicated at $b$. Continued outward movement of the mold 13 to the position $c$ and simultaneous inward movement of the bending rods 60 and 61 to position $d$ will result in the glass sheet being bent or wrapped about the curved bending surface 14 of the mold as indicated at $e$. The provision of the compression springs 59 permit the bending rods 60 and 61 to slide laterally over the glass sheet during the bending thereof as well as permitting outward movement of said bending rods when the edge portions of the glass sheet are forced into engagement with the mold, thereby minimizing marring of the glass by said bending rods as well as allowing for sheets of different thicknesses. As pointed out above, the glass sheet, after being bent, can either be slowly annealed or suddenly chilled to temper the same. The hooks or tongs 11 from which the glass sheet 10 is hung in no way interfere with the bending operation.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for bending glass sheets, means for suspending the sheet to be bent in a vertical position, a mold member located at one side of the sheet and having a vertical convex bending surface adapted to initially engage said sheet intermediate the edges thereof, bending means located at the opposite side of the sheet and adapted to engage the same adjacent opposite edges thereof only, means for moving said mold member horizontally toward the glass sheet, and means actuated by movement of the mold member for effecting simultaneous movement of the bending means in the opposite direction to cause the glass sheet to be wrapped about said convex bending surface.

2. In apparatus for bending glass sheets, means for suspending the sheet to be bent in a vertical position, a mold member located at one side of the sheet and having a vertical convex bending surface adapted to initially engage said sheet intermediate the edges thereof, pivotally mounted bending means located at the opposite side of the sheet and adapted to engage the same adjacent opposite edges thereof only, means for moving the mold member horizontally toward the sheet, and connections between said mold member and bending means for effecting pivotal movement of the said bending means in the opposite direction to cause the glass sheet to be wrapped about said convex bending surface.

3. In apparatus for bending glass sheets, means for suspending the sheet to be bent in a vertical position, a mold member located at one side of the sheet and having a vertical convex bending surface adapted to initially engage said sheet intermediate the edges thereof, bending means located at the opposite side of the sheet and including rod-like bending elements adapted to engage said sheet adjacent opposite edges thereof only, means for mounting said rod-like bending elements for swinging movement, means for moving the mold member horizontally toward the sheet, and means actuated by movement of said mold member to effect swinging movement of said rod-like bending elements in the opposite direction to cause the glass sheet to be wrapped about said convex bending surface.

ORMOND H. PADDOCK.